(12) United States Patent
Cathaud

(10) Patent No.: US 10,568,302 B2
(45) Date of Patent: Feb. 25, 2020

(54) HEAD OF AN ANIMAL GROOMING BRUSH WITH MANUALLY RETRACTABLE COMB

(71) Applicant: SSERTSON GROUP, Saint-Romain-le-Puy (FR)

(72) Inventor: Eddy Cathaud, L'Hopital le Grand (FR)

(73) Assignee: SSERTSON GROUP, Saint-Romain-le-Puy (FR)

( * ) Notice: Subject to any disclaimer, the term of this patent is extended or adjusted under 35 U.S.C. 154(b) by 213 days.

(21) Appl. No.: 15/513,294

(22) PCT Filed: Sep. 18, 2015

(86) PCT No.: PCT/FR2015/052516
§ 371 (c)(1),
(2) Date: Mar. 22, 2017

(87) PCT Pub. No.: WO2016/051046
PCT Pub. Date: Apr. 7, 2016

(65) Prior Publication Data
US 2017/0295753 A1    Oct. 19, 2017

(30) Foreign Application Priority Data

Sep. 30, 2014 (FR) ...................................... 14 59273

(51) Int. Cl.
*A01K 13/00* (2006.01)
*A46B 7/02* (2006.01)
(52) U.S. Cl.
CPC ............ *A01K 13/002* (2013.01); *A46B 7/023* (2013.01); *A46B 2200/1093* (2013.01)
(58) Field of Classification Search
CPC ...... A01K 13/002; A01K 13/00; A46B 7/023; A46B 2200/1093; A45D 24/10; A45D 24/40; A45D 24/42
See application file for complete search history.

(56) References Cited

U.S. PATENT DOCUMENTS 670,254 A * 3/1901 Slater .................. A01K 13/002
                                                                 119/628
962,666 A * 6/1910 Rahn .................. A01K 13/002
                                                                 119/629
(Continued)

FOREIGN PATENT DOCUMENTS

FR      2 595 539 A1   9/1987
FR      2 835 719 A1   8/2003

OTHER PUBLICATIONS

International Search Report, dated Dec. 11, 2015, from corresponding PCT application.

*Primary Examiner* — Magdalena Topolski
(74) *Attorney, Agent, or Firm* — Young & Thompson

(57) ABSTRACT

A head of an animal grooming brush has a manually retractable comb with a handle, a head with a movable lamellar comb, a controller for movement thereof and a device for setting the comb. The comb can be replaced without removing the head and without resorting to tools, the transverse setting thereof can be set in a plurality of positions. The comb is connected, in a removable manner and by transverse sliding, to a cradle connected to a connecting rod and a lever which, supporting a control button, is rigidly connected to lateral cylindrical pawls used for hingedly connecting the connecting rod to the head and engaging with positioning notches arranged in the head, placing the comb in a plurality of longitudinal positions, while allowing movement in a plurality of positions, including a maintenance position allowing the comb to be removed from the cradle for replacement.

5 Claims, 5 Drawing Sheets

(56) References Cited

U.S. PATENT DOCUMENTS

| | | | |
|---|---|---|---|
| 3,626,546 A | 12/1971 | Dove | |
| 4,574,416 A * | 3/1986 | Stewart | A46B 7/023 |
| | | | 119/628 |
| 4,779,572 A | 10/1988 | Freulon | |
| 4,860,692 A | 8/1989 | Beard | |
| 4,977,909 A * | 12/1990 | Chou | A45D 19/02 |
| | | | 132/123 |
| 5,267,528 A * | 12/1993 | Murieen, Sr. | A46B 17/06 |
| | | | 119/628 |
| 6,427,633 B1 * | 8/2002 | Ogden | A01K 13/002 |
| | | | 119/600 |
| 8,082,887 B2 * | 12/2011 | Fernandez | A01K 13/002 |
| | | | 119/612 |
| 2003/0172947 A1 | 9/2003 | Wang | |
| 2013/0343041 A1 | 12/2013 | Renforth et al. | |
| 2016/0073612 A1 * | 3/2016 | Cafasso | A45D 24/10 |
| | | | 119/601 |
| 2019/0124885 A1 * | 5/2019 | Pereira | A01K 13/00 |

* cited by examiner

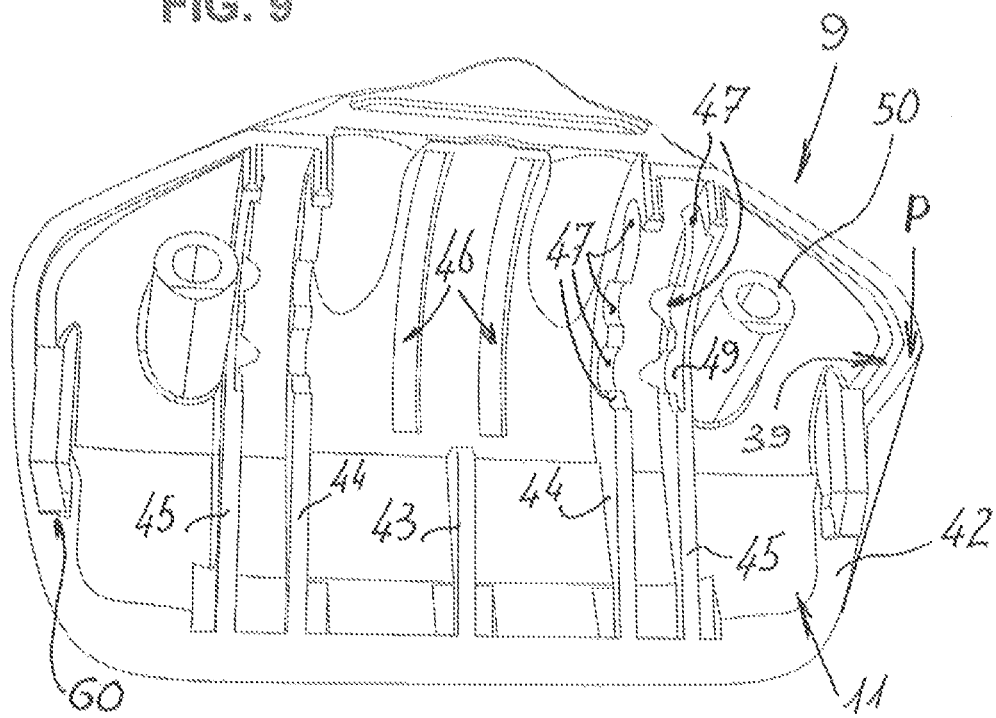
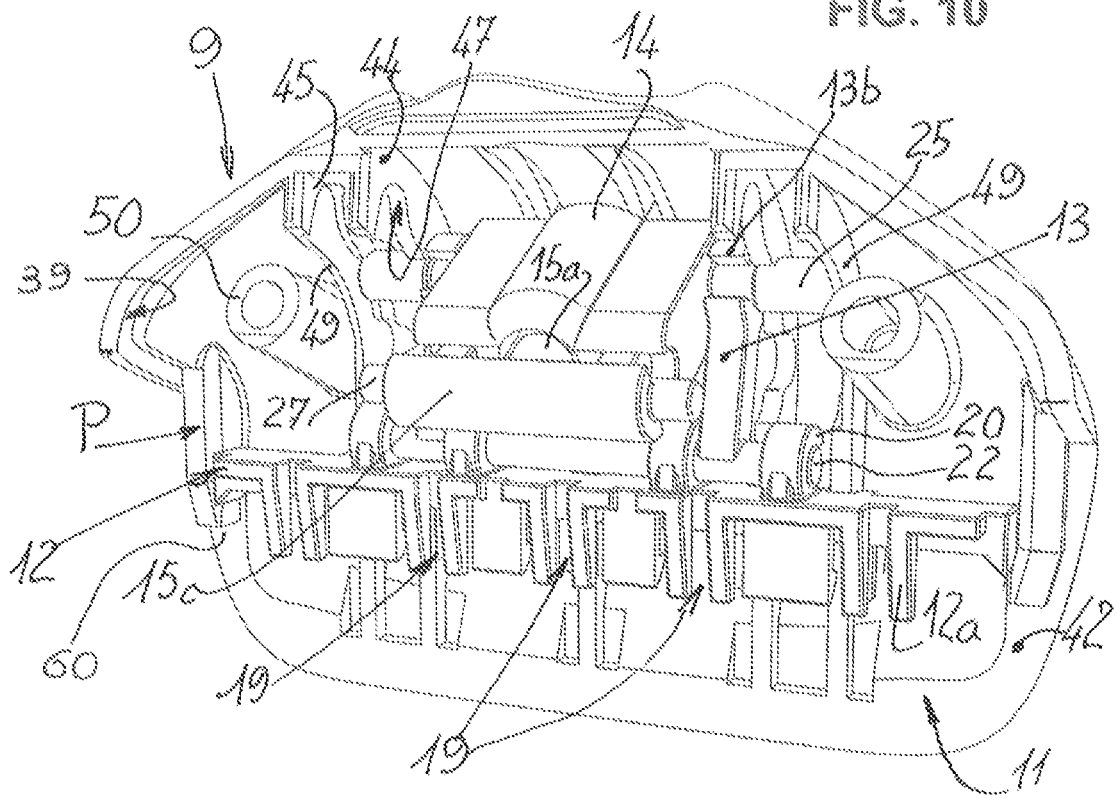

HEAD OF AN ANIMAL GROOMING BRUSH WITH MANUALLY RETRACTABLE COMB

The invention relates to the grooming of the coats of animals and more particularly a manual brush head.

In order to maintain the coat of domestic animals, such as dogs and cats, it is known to groom them regularly, and in particular to brush them manually with a brush comprised of a handle and of a head with a comb, in general removable and interchangeable. In current brushes, the comb is comprised of a metal blade of which the body is provided with means of fastening to the head of the handle and of a bevelled edge wherein the teeth are made by machining.

During the brushing of an animal, the dead hairs removed from the fur by the brushing accumulate between the teeth and, little by little, limit the engaging of the toothing of the comb in the fur and disturb the brushing.

In order to overcome this, and as is described in documents FR2999871 and US2009/0126648, manufacturers add to the comb a planar pallet which can be moved manually by a tappet, on a face of the comb and in the direction of the tooth gap thereof. The cleaning movement towards the free end of the teeth flushes the tufts, dead hair and dust accumulated in the tooth gaps and makes it possible to resume the brushing in the original conditions thereof. In general, spring means recall the tappet in its initial removal position in the head. In this removal position the pallet does not protect the user from the aggressiveness of the sharp toothing of the comb. The teeth of the metal comb are thin and fragile and, without any additional protection, can be bent and deformed when the brush is set down, even for a brief moment.

Document US2013/0343041, describes an anti-flea brush that partially overcomes these disadvantages. The lamellar comb is arranged in a body in two portions and can be moved longitudinally through an opening between a removal position inside the body, wherein the comb is protected and is not dangerous for the environment, and a brushing position, wherein the toothing thereof is outside of the body in order to be used for brushing. The retraction of the comb into the body is carried out by sliding on sliders and cause, by the movement of its toothing, the abutment of the dead hair, dust and other deposits taken by the brushing, against the edges of the opening of the body, then the ejection therefore from the toothing.

However, this function is used only for facilitating the vision of fleas in the hairs of the coat, assisted in this by exterior means for illuminating the comb, and is not suited for a smoothing of the hair.

In addition, replacing the comb is not considered, as it requires a complete disassembly of the body with resorting to tools, in such a way that it is not possible to easily change the grooming tool in order to replace it, in case of wear and tear or in order to adapt it either to the coat of the animal, or to the grooming function, by using combs that have teeth with a different shape and spacing.

Finally, the means described in this document that govern the movements of the comb and that provide the setting thereof in position cannot be transposed such as in a brush of which their curved head is arranged at the end of a handle, because the straight movements communicated to the comb in order to move it and the transverse setting movements would not be compatible with the inner space of the head. Likewise, the guiding of the comb would be insufficient to resist the forces of the brushing and of the coat, forces that are much higher than those generated by a meticulous removal of fleas.

It is precisely these disadvantages that the invention intends to overcome by providing a brush of which the head, provided with means for ejecting hairs outside of the tooth gaps of the comb, contains a comb that, able to be replaced without removing this head and without resorting to tools, engages with means that ensure the transverse setting of the comb in a plurality of positions.

The invention therefore relates to a brush provided with a handle and with a head of which the body is in two elements defining an inner space containing the comb and having an opening of which the lips provide the ejection of hairs outside of the tooth gaps, with said inner space also containing means that provide for the movement of this comb, which can be actuated by a control button external to the head, and means for setting on the head of at least one longitudinal position of the comb.

According to the invention, the comb is connected, in a removable manner and by transverse sliding, to a cradle that can be moved in translation in the head, and this cradle is connected to the means ensuring the movement thereof, means comprising:
  a connecting rod, of which one of the ends is articulated on the cradle,
  and a lever for controlling the movement, qui, articulated with the other end of the connecting rod:
    firstly, is provided with at least one longitudinal tenon, passing through the wall of the upper element of the head, in order to receive the control button,
    secondly, is integral with the lateral cylindrical pawls which are used for hingedly connecting the connecting rod to the body and engaging with positioning notches arranged in the upper element of the head, with these notches providing the setting of the comb in a plurality of positions of the comb,
    and, thirdly, contains a body for articulation pivotably mounted in the lower element of the head and whereon it is slidably mounted with interposition of a spring working via extension, in order to thrust the cylindrical pawls thereof against the setting notches.

With this arrangement, the comb is connected only to the cradle and it is the cradle that is connected to the means for controlling the movement of the comb, mechanically and by the intermediary of a linkage system of which the structure and the kinetics are integrated into the internal space of the head and make it possible to communicate to the comb a plurality of positions outside of the head, in order to adjust the exit length thereof to the length of the hairs.

In an embodiment, the cradle a U-shaped transverse section of which the wings are provided with internal notches facing and able to engage into opposite grooves arranged in the rear end of the comb, perpendicularly to the toothing and opposite the latter, with these wings comprising outside and on each side, guiding grooves that cover ribs arranged for them in the two elements of the head, parallel to the direction of movement of the cradle.

As such, the entering and exiting movements of the comb are perfectly guided in translation and do not risk causing blockage by jamming. In addition, the engaging of the grooves and ribs assure the retaining of the cradle which cannot be shifted transversally under the effect of the forces of the brushing exerted on the comb.

In a preferred embodiment, the upper element of the head comprises, in each one of its guiding ribs of the cradle, a series of three notches providing the setting in translation of the pawls of the control lever therefore of the cradle supporting the comb, respectively, in a retracted removal position of the comb in the head, in the exiting position of the comb for brushing short hair and in the exiting position of the comb for brushing long hair.

This multiplication of the positions with setting of the comb, guarantees its positioning in the head, not only when it is inside the latter but also in each one of its working positions, while still allowing the user to adapt the standing out of the teeth to the length of the hairs of the animal that he or she is grooming.

Advantageously, the means for controlling the movement of the cradle supporting the comb communicate to it an additional stroke of movement, bringing this cradle in a maintenance position wherein its zone of linkage with the comb comes on the lateral passage notches, arranged in the two elements that form the head that allows, via a transverse movement, the comb to be removed from the cradle and from the head and the replacement thereof with another comb or another grooming element.

As such, even a user that is not very mechanical, can, without having to remove the head, change the comb by communicating to it a movement of transverse sliding with respect to the cradle which remains immobile in the head. This facilitates the replacement thereof in case of wear and tear, but also makes it possible to replace it with a comb or another grooming tool that provides a different function, or to turn it over if it comprises a double toothing.

Other characteristics and advantages shall result from the following description, in reference to the annexed diagrammatical drawing, showing an embodiment of this comb.

FIGS. 9 and 10 are perspective views on an enlarged scale of the upper element of the head, respectively alone and garnished with the other components of this head;

Figure 1:
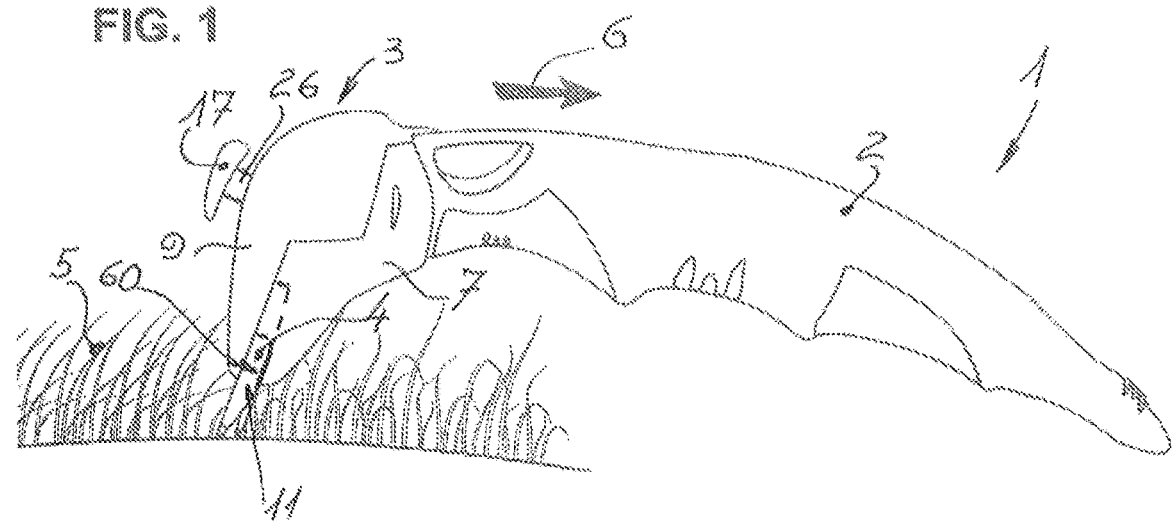
FIG. 1 is a side view in elevation of an embodiment of the brush when it is engaged in the coat of an animal.

Generally and as shown in FIG. 1, the brush 1 is comprised of a handle 2 and of a head 3 supporting a comb 4, made of metal or of a synthetic material, for example of polyamide. The toothing of the comb 4 comprises one or two rows of teeth intended to penetrate into the coat 5 of an animal in order to provide for the brushing of the latter by movement in the direction of the arrow 6. The comb is of lamellar shape and comprises two planar and parallel faces.

As shown in FIGS. 2 to 6, the head 3 is comprised of a lower element 7, carrying a linkage tenon 8 with the handle 2, and of an upper element 9 connected to the element 7 by screws not shown.

The tenon 8 is provided with means, not shown, for snap-fitting with the handle 2. This arrangement makes it possible to use the handle with other interchangeable grooming tools or that exercise other functions.

In an alternative, not shown, the lower element 7 is monolithic with the handle, but comprises the same structure as that described hereinafter in order to provide the same functions making it possible to obtain the same results, except for the interchangeability of the head with the handle.

The two elements 7 and 9 of the head 9 define an internal volume 10 with an opening 11 defined between the edges thereof in the form of lips. This volume, visible in FIGS. 2 to 4, contains the means for maintaining the comb 4 and the means for movement thereof and for controlling this movement.

The means for maintaining the comb 4 are comprised of a cradle 12, while its means for movement comprise a connecting rod 13, a control lever 14, with an articulation part 15 and return spring 16 (preferably metal), and a control button 17. These components are obtained by moulding of synthetic material and shall be described in detail in reference to the exploded FIGS. 5 and 6.

Figure 8:
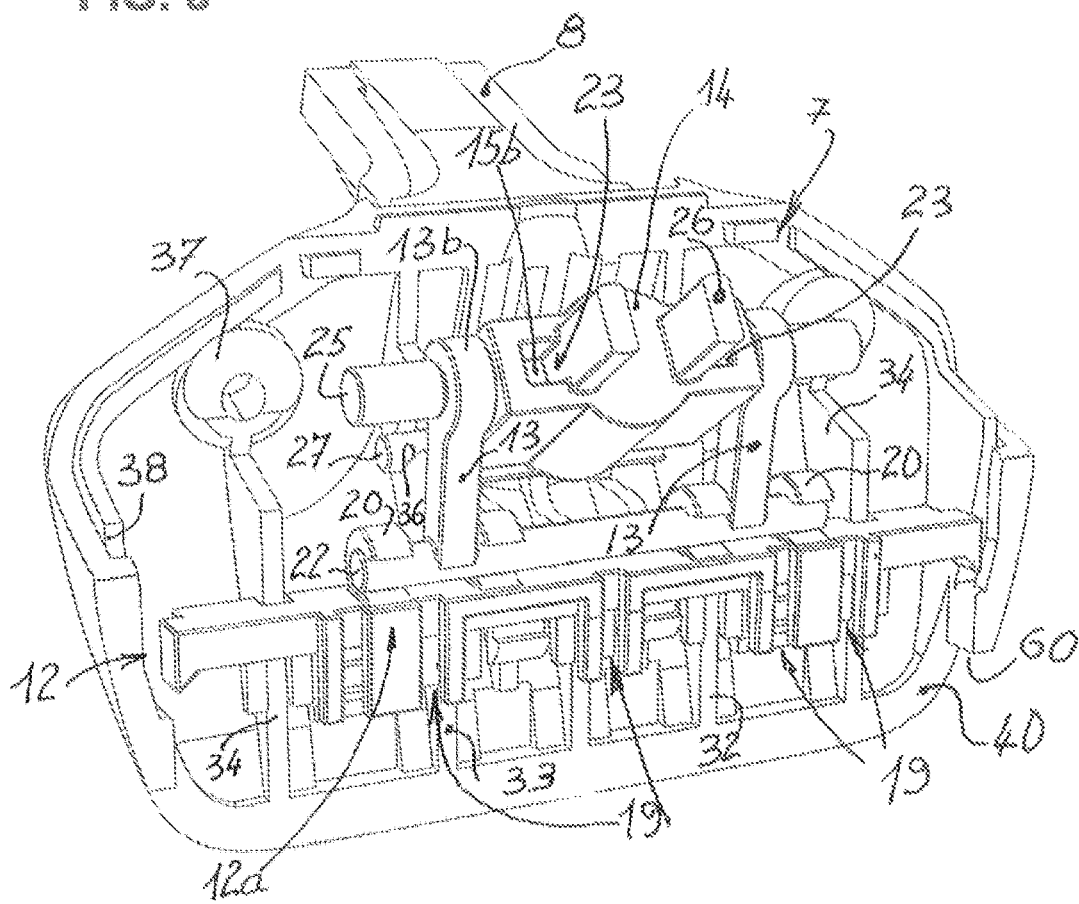

The cradle 12 has a U-shaped transverse section of which the two wings 12a are provided with notches 18 which, protruding from the internal faces thereof, are facing, and are arranged parallel to its core. These notches form means for retaining the comb 4 by engaging in grooves 4b arranged in the rear end thereof 4a. These grooves are arranged perpendicularly to the direction of the teeth of the comb, opposite this rear edge. FIGS. 8 and 10 show that the external faces of the wings 12a of the cradle are provided with guiding grooves 19, which are parallel to the direction of the teeth.

The core of the cradle 12 is provided, protruding from the external face thereof, with several hooks 20, namely two in this embodiment. These hooks form swivel bearings for a transverse shaft 22 extending at one of the ends of each one of the two arms 13a that constitute the connecting rod 13. The other end of each arm 13a is provided with a hook 13b forming a swivel bearing.

The control lever 14 comprises a tubular body wherein is housed the spring 16 centred by a tenon 15a protruding from the articulation part 15. The FIG. 8 shows that the tubular body 14 is bordered by two longitudinal corridors 23 wherein two arms 15b slide, parallel to the tenon 15a and arranged on either side of it. The body of the control lever 14 is also integral on the one hand, with the two tips of the transversal shafts 25 protruding laterally and pivotably mounted in the bearings 13b of the connecting rod, and, on the other hand, with two longitudinal tenons 26 used for the fastening of the button for manoeuvring 17.

Figure 5:
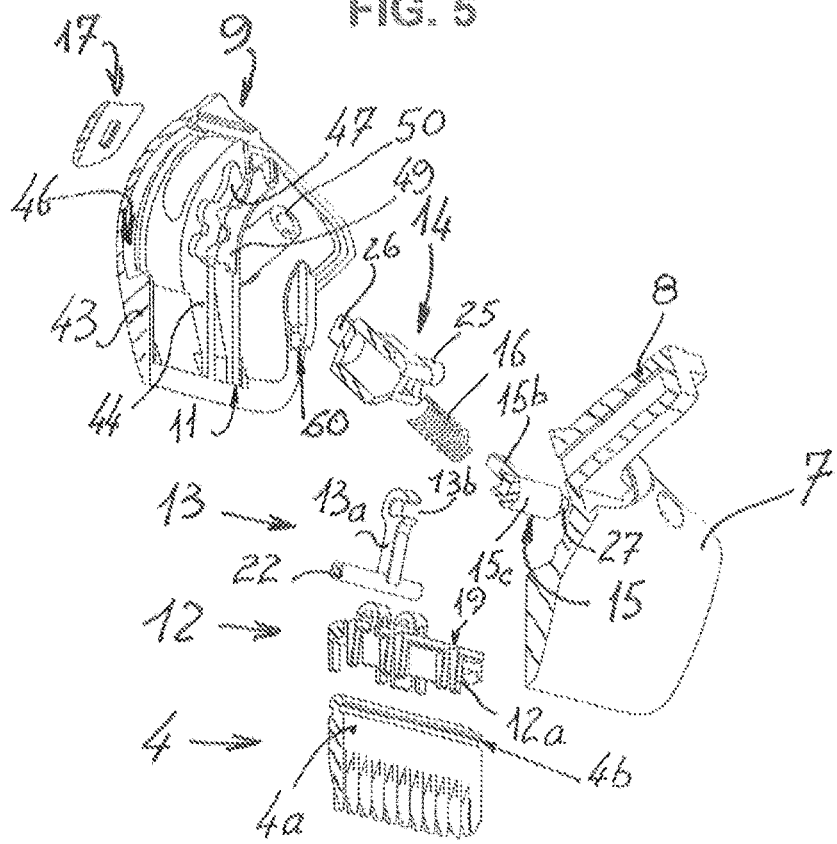
FIGS. 5 and 6 are views in perspective that are exploded and as a partial cross-section, when viewing the inside portion, respectively, of the upper element of the head and of the lower element of the same head.
Figure 6:
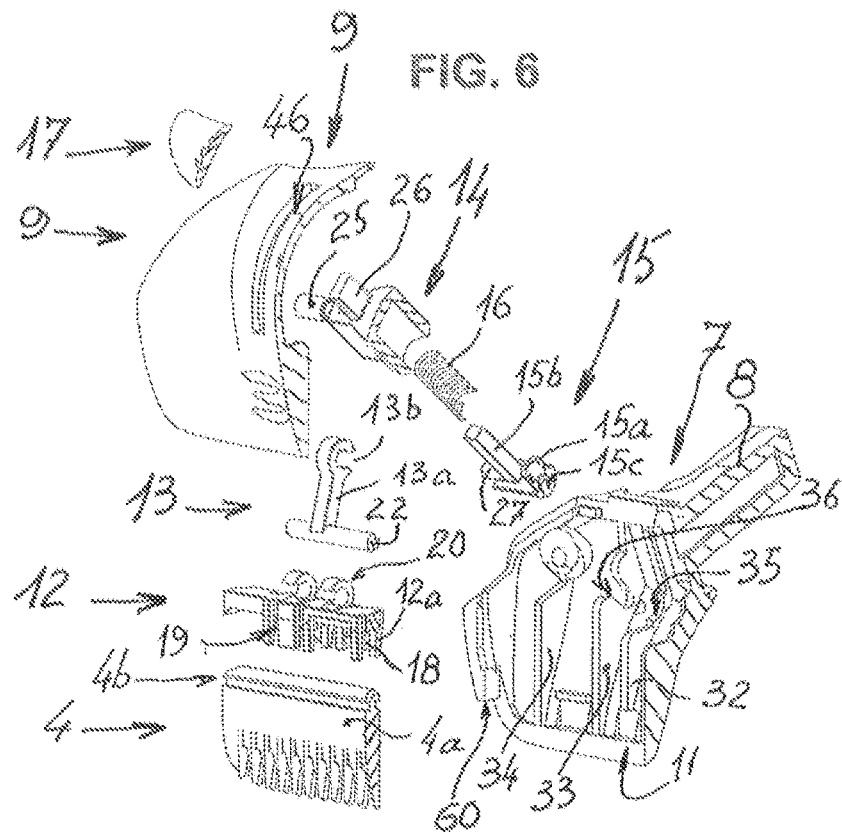

FIGS. 5 and 10 show that the articulation part 15 comprises a rounded crosspiece 15c extended by tips of circular shafts 27.

As these components 12 to 16 are mounted in the space 10 defined by the elements 7 and 9 of the case, the latter shall now be described in detail in reference to FIGS. 7 to 10.

Figure 7:
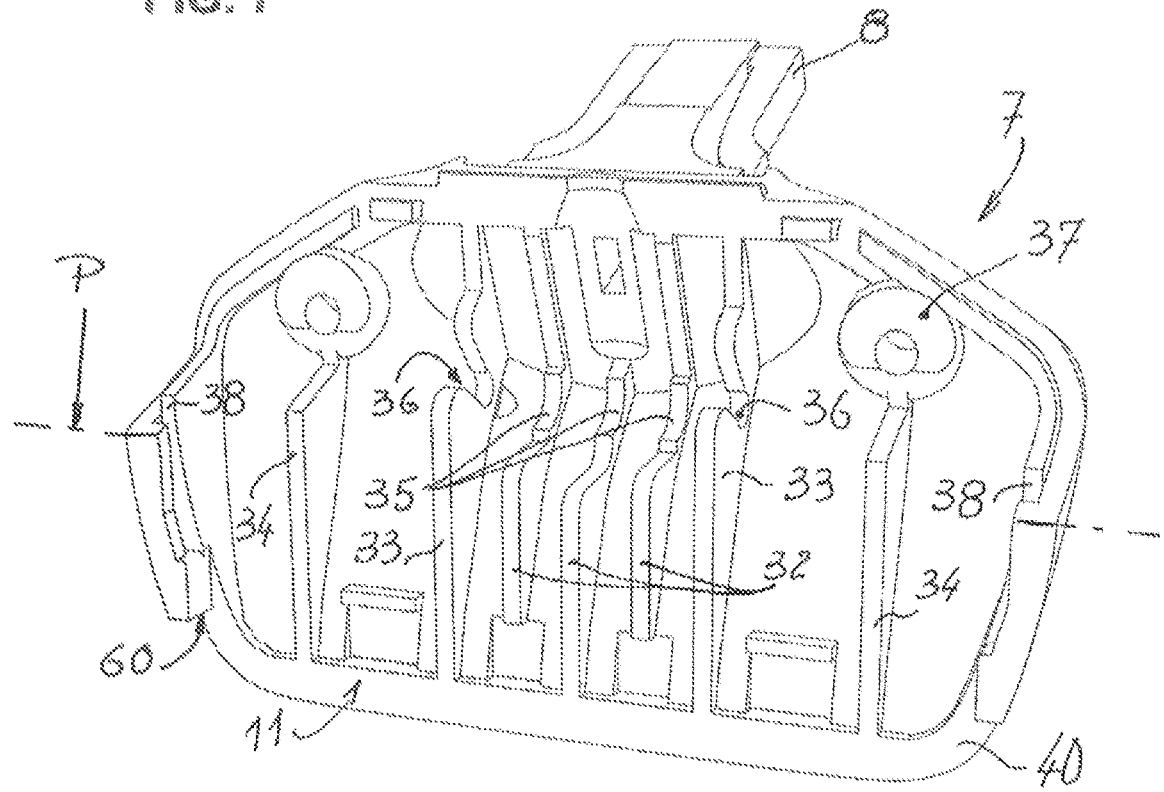
FIGS. 7 and 8 are views in perspective and on an enlarged scale of the lower element of the head, respectively alone and garnished by the other components of this head.

As shown in detail in FIG. 7, the lower element 7 of the head 3 is comprised of an untreated concave wall of injection comprising a smooth convex external face and an internal face spiked with ribs, namely, three central ribs 32 bordered by two intermediate ribs 33 and by two lateral ribs 34. These ribs are intended to engage with the grooves 12 of the cradle 2 in order to guide the latter in the movements thereof. The central grooves 32 each comprise a fragment of a circular bearing 35 able to receive, as shown in FIG. 8, the rounded crosspiece 15c of the articulation part 15, which each one of the intermediate crosspieces 33 comprises a deep bearing 36, able to receive one of the two tips of the shaft 27 of the same crosspiece 15c, which is as such perfectly guided in rotation.

The lower element 7 of the head comprises protruding from the wall thereof reinforced smooth bores 37 for the passing of the linking screws with the upper element 9 and comprises, in its connecting plane P, a rib 38 shown in FIG. 7. FIG. 9 shows that the element 9 comprises, inside the internal edge of its connecting plane P, a clearance 39 able, when the elements 7 and 9 are assembled, to receive the rib 38 of the element 7 in order to improve the relative positioning of these elements and mask any separation thereof.

The front edge of the element 7 comprises a lip 40 that, as a recess in relation to the connecting plane P, is intended to come into sliding contact with the comb, in the same way as the lip 42 provided as a recess of the connecting plane of the upper element 9.

Finally, the two elements 7 and 9 comprise, on either side of the opening 11 that they define, notches 60 of a width at least equal to the thickness of the rear portion of the comb 4 which must pass through it when the cradle thereof is in maintenance position.

The upper element 9 of the head 3, shown in detail in FIG. 9, is comprised of an untreated concave wall for injection comprising a smooth convex external face and, protruding from the internal face thereof, a central rib 43, two intermediate ribs 44 and two external lateral ribs 45. These ribs are parallel to the direction of movement of the comb and intended to engage with the grooves 19 of the cradle 2 in order to guide the latter in the movements thereof. The central groove 43 is shorter than the others in order to leave space to the control lever 15 and, in particular to the tenons thereof 26, that pass through the wall of the element through two slots 46.

In this embodiment, the ribs 44 and 45 each comprise a series of three circular notches 47 that can each engage with one of the tips of shafts 25 of the control lever 14. They materialise the three setting positions of the lever 14 and of the comb 12, namely a retracted position of the comb, an exited position for short-hair coats and an exited position for long-hair coats.

The notches 47 of the external ribs 45 are closed off, laterally and outwards, by a veil of material 49 that limits any transverse movements of the lever 14.

Finally, the element 9 of the head is integral with the well 50 for receiving screws providing the linkage thereof with the lower element 7.

Figure 2:
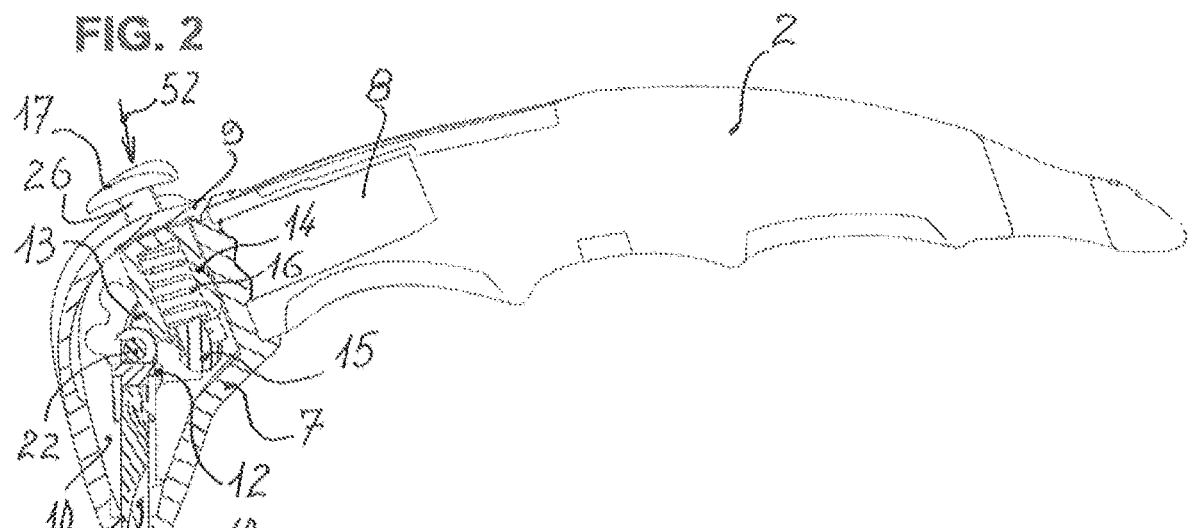
FIG. 2 is a side view with a partial cross-section of the head of the brush of FIG. 1, when the comb is in a storage position inside this head.

In FIG. 2, the components of the head 3 are assembled and the tappet and in the retraction position of the comb 4 in this head. The tips of the shafts 25 of the control lever 14 are engaged in the notches 47 and provide the locking of the comb 4 in this position. The comb is entirely in the head, in such a way that is cannot injure anyone and the toothing thereof is protected.

Figure 3:
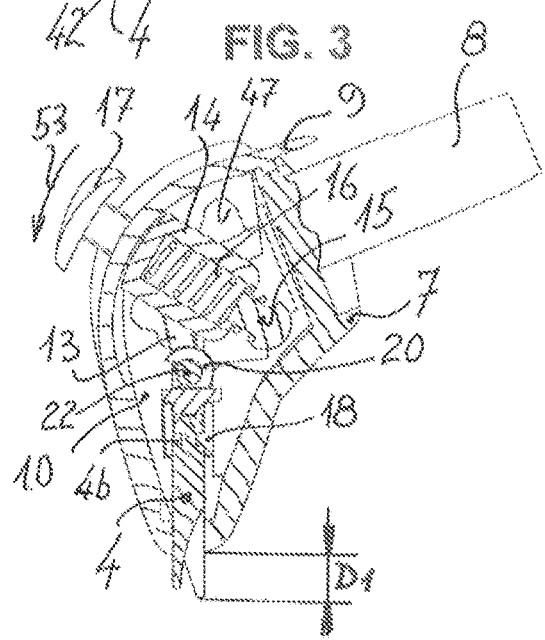
FIGS. 3, 4 and 11 are partial views of the side and as a cross-section of the head, when the comb is, respectively, in exited position for brushing short hair, in exited position for brushing long hair and in extracted and replacement position.

In order to switch to the position of FIG. 3, wherein the comb is exited for the brushing of a short-hair coat, a pressure must first be exerted on the tappet 17, in the direction of the arrow 52 of FIG. 2, in order to unlock by causing to the tips of shafts 25 to exit from the notches 47, then pivot the lever 14 in the direction of the arrow 53 of FIG. 3 to the following notches 47. During this switching the spring 16 is compressed and the articulation part 15 pivots in the fixed bearings 35 and 36. The releasing of the radial force on the tappet 17 allows the spring 16 to return the lever 14 to setting position by engaging the tips of shafts thereof 27 in the following series of notches 47.

The movement of the lever 14 causes, by the connecting rod 13 and the cradle 12, the longitudinal movement of the comb 12 between the lips 40 and 42 of the elements of the head and brings a portion of the comb 12 to stand out from the head by a value D1, shown in FIG. 3.

Figure 4:
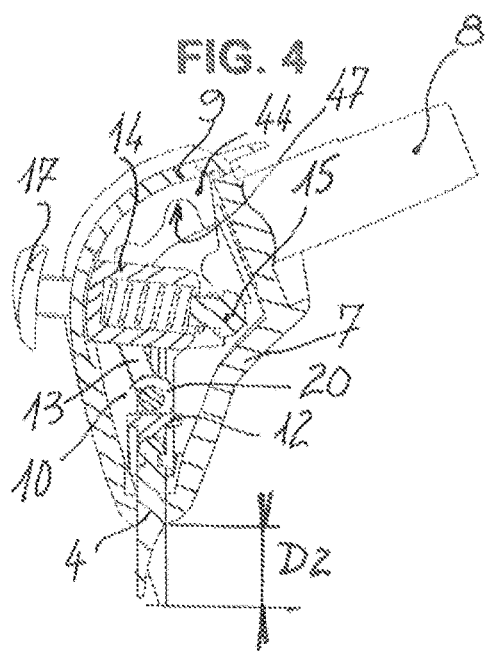

In FIG. 4, a movement of the lever 14 in the same conditions, but until its last position of notching, causes the comb 4 to exit by a value D2, greater than D1, and corresponding to the brushing of a long-hair coat.

If during the brushing, with a brush in one or the other of the two brushing positions, the intervals between the teeth of the comb are shut off by an accumulation of spikelets, dead hair and various dusts, the groomer can easily clean the comb by causing it to retract into the head 3. During the retraction movement, in the reverse direction of the arrow 53, the edges of the two lips 40 and 42 that slide on the faces of the lamellar comb stop the hairs that stand out from the tooth gaps. This result in that the clumps of hair are stopped by the lips until the comb is entirely retracted into the head.

Figure 11:
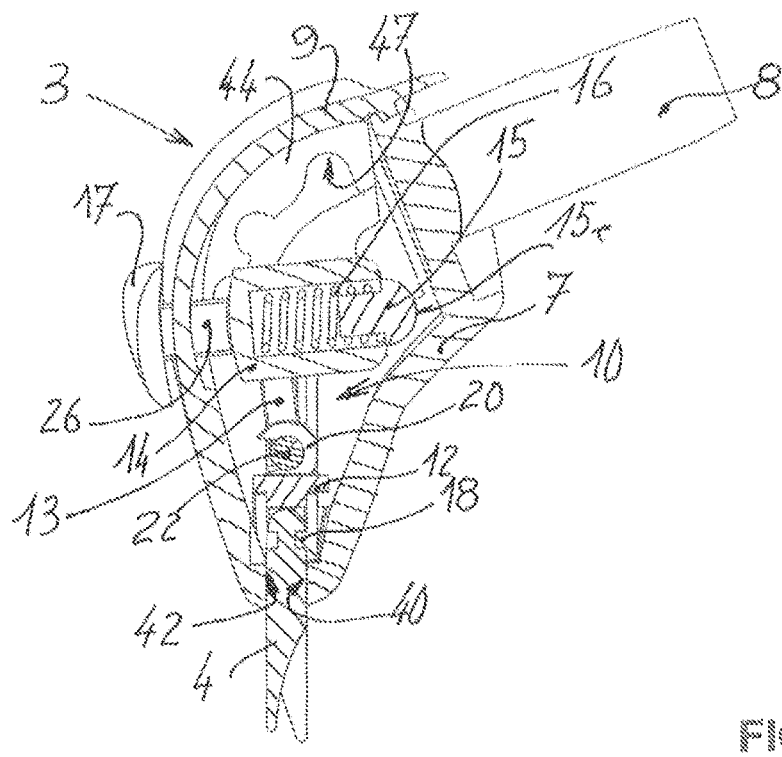

FIG. 11 shows the two elements 7 and 9 of the head and the mechanism that it contains are structured so that the cradle can be brought into an additional maintenance position, not braced, wherein the linkage zone of the cradle 12 with the comb 4 on notches 60 allowing for the transverse movement of the comb 4.

Figure 12:
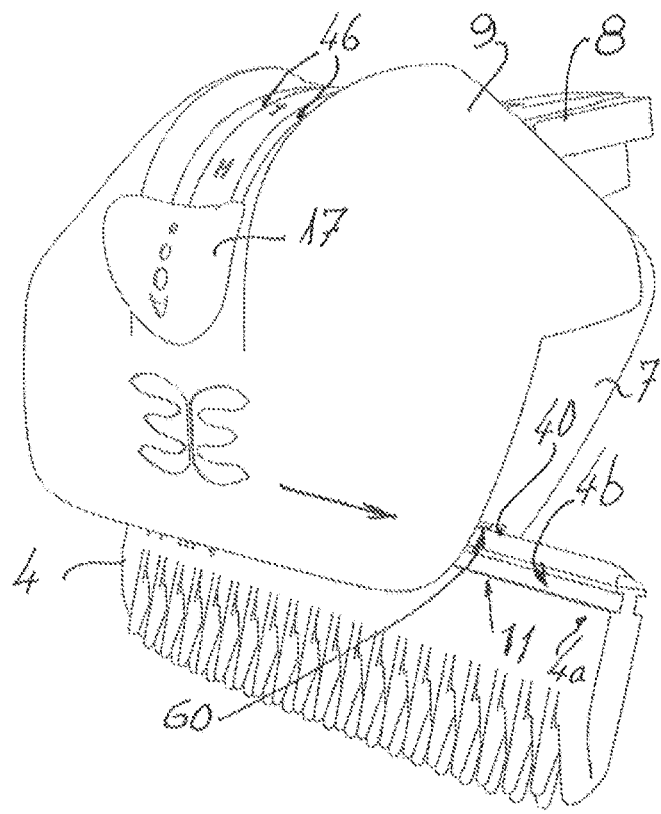
FIG. 12 is a perspective view of the head when the latter is in extracted position of the comb, with the latter being partially extracted by sliding of the cradle that supports it.

FIG. 12 shows that in this maintenance position, the comb 4 can easily be extracted from the cradle by sliding, either to be replaced with a new comb, or to be replaced with a comb having a toothing that is adapted to the coat of the animal, either to be turned over when the comb has a double toothing, or to be replaced with another grooming tool, comprising teeth or not.

In order to return the comb in working position with setting, it is sufficient to control its retraction by means of the control lever 14.

It results from the preceding description that the head of the brush according to the invention males it possible:
  in working position, to modify the length of the standing
    out of the comb in order to adapt it to the fur of the
    animal that is to be brushed,
  in storage position, to return the entire comb into the head
    in order to suppress the risk of injury or catching by
    sharp teeth, but also to protect the teeth thereof against
    impact and friction, by as such reducing its wear and
    tear and deteriorations thereof, and,
  in maintenance position, to proceed with the replacing of
    the comb and the interchangeability thereof, without
    resorting to any tool.

The invention claimed is:

1. A head of an animal grooming brush with a manually retractable comb assembly, comprising two elements defining an inner space with lips for ejecting hairs, and a comb mounted in the head and slidable between a retracted position in the head and at least one brushing position wherein toothing of the comb projects from the lips, the lamellar comb being connected to a linkage for manually controlling the movement of the comb, which is actuated by a button external to the head, the head comprising notches defining longitudinal positions of the comb, wherein the comb is connected to a cradle that is movable in translation in the head, the comb being removable from the cradle by transverse sliding, and the cradle being connected to the linkage, the linkage comprising:
  a connecting rod, one end of which is articulated on the cradle;
  a lever for controlling the movement, which is articulated on another end of the connecting rod;
  the lever comprising at least one longitudinal tenon passing through an upper element of the head and receiving the button, the lever further being integral with lateral cylindrical pawls used for the articulation of the connecting rod and engaging with said notches arranged in the upper element of the head, with these notches providing the setting of the comb in a plurality of longitudinal positions of the comb; and an articulation body pivotably mounted in a lower element of the head and slidably mounted to the lever via a spring that urges the lateral cylindrical pawls of the lever toward the notches.

2. The head of the animal grooming brush with the manually retractable comb assembly according to claim 1, wherein the cradle has a U-shaped transverse section and comprises interior ribs adapted to engage in corresponding grooves formed in the comb, the ribs and grooves extending perpendicular to the toothing of the comb, the cradle further comprising guide grooves engaging with guide ribs formed in the two elements of the head, the guide grooves and guide ribs extending parallel to a direction of the transverse sliding movement of the comb relative to the head.

3. The head of the animal grooming brush with the manually retractable comb assembly according to claim 1, wherein each guide rib in the upper element of the head comprises a series of three notches that define the retracted position of the comb within the head, wherein the at least one brushing position comprises a first projecting position of the comb for brushing short hair and a second projecting position of the comb for brushing long hair.

4. The head of the animal grooming brush with the manually retractable comb assembly according to claim 3, wherein the comb is movable via the linkage to a maintenance position different from the at least one brushing position in which the comb projects farther from said housing than when in said second projecting position and in which the comb can be removed from the cradle and the housing by sliding the comb transversely relative to the cradle without disassembly of the head.

5. The head of the animal grooming brush with the manually retractable comb assembly according to claim 1, wherein the comb is movable via the linkage to a maintenance position different from the at least one brushing position in which the comb projects sufficiently far from the housing that the comb can be removed from the cradle and the housing by sliding the comb transversely relative to the cradle without disassembly of the head.

* * * * *